M. E. LAYNE & S. N. HALL.
HYDRAULIC SWIVEL.
APPLICATION FILED AUG. 3, 1909. RENEWED NOV. 25, 1913.

1,133,295.

Patented Mar. 30, 1915.

WITNESSES:
E. C. Davis
Eugene Taylor

INVENTORS.
Mahlon E. Layne.
Samuel N. Hall.
BY Schley & Davis
ATTORNEYS.

UNITED STATES PATENT OFFICE.

MAHLON E. LAYNE AND SAMUEL N. HALL, OF HOUSTON, TEXAS.

HYDRAULIC SWIVEL.

1,133,295. Specification of Letters Patent. Patented Mar. 30, 1915.

Application filed August 3, 1909, Serial No. 511,040. Renewed November 25, 1913. Serial No. 803,027.

*To all whom it may concern:*

Be it known that we, MAHLON E. LAYNE and SAMUEL N. HALL, citizens of the United States, residing at Houston, in the county of Harris and State of Texas, have invented a new and useful Improvement in Hydraulic Swivels, of which the following is a specification.

This invention relates to new and useful improvements in hydraulic swivels.

The object of the invention is to provide certain improvements over the swivel shown in Letters Patent No. 992,363 issue May 16th, 1911, issued to M. E. Layne, S. N. Hall, and C. F. Layne, said improvements consisting of an adjustable packing gland so arranged as to be adjusted from the exterior of the swivel without removing any of the parts thereof; the provision of cone bearings; the provision of a follower ring adapted to compensate for uneven adjustment of the packing gland; provision for an oil bath about the packing gland; provision for vertically supplying a lubricant to the cone bearings; provision for locking the bearing collar and the head in fixed relation; and the provision for temporarily locking the bearing disk and the head together to permit the shell to be unscrewed.

Further objects are compactness, simplicity of parts, added strength and durability, and the reduction of wear to a minimum.

Figure 1:
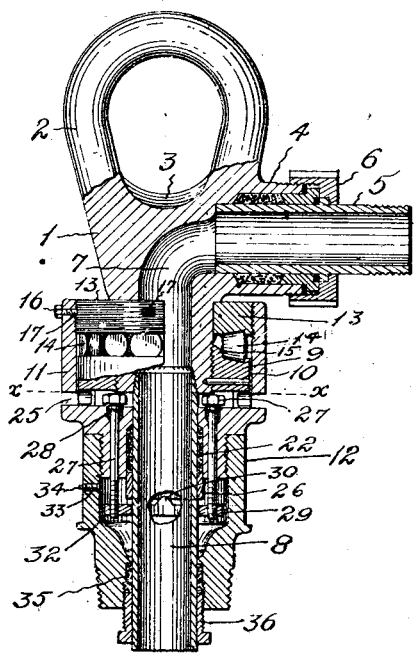
Figure 2:
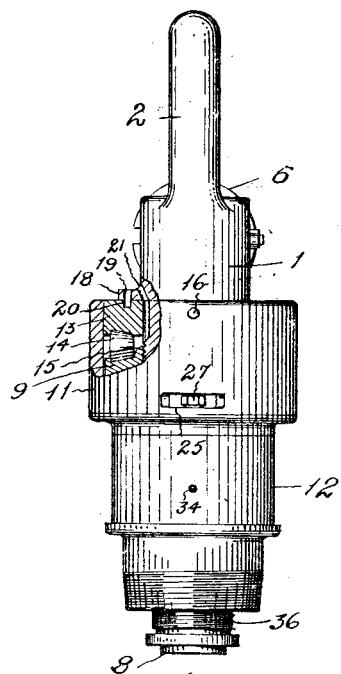
Figure 3:
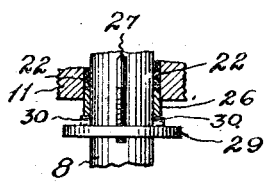
Figure 4:
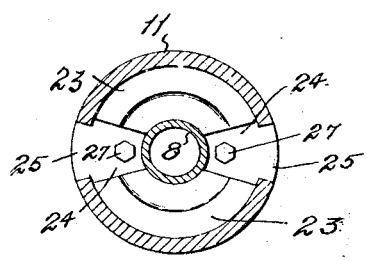

With the above and other objects in view, the invention has relation to certain novel features of construction and operation, an example is described in this specification and illustrated in the accompanying drawings, herein:

Figure 1 is a longitudinal sectional view of the swivel, with a portion of the bearing in elevation. Fig. 2 is an elevation, a portion being in section to show the means for supplying the lubricant to bearing. Fig. 3 is a detail of the gland adjusting means, and Fig. 4 is a transverse section on the line $x$—$x$ of Fig. 1.

In the drawings, the numeral 1 designates a head or upper swivel member having at its upper end a loop 2 adapted to receive the usual supporting hook and in order to prevent the disengagement of this hook from the loop during the vertical vibration of these parts, a recess 3 is provided at the lower portion of the loop to receive the lower bend of the hook.

The head is provided at its central portion with a laterally projecting neck 4, in which a coupling member 5 is rotatably held by a suitable packing member 6. The outer end of the coupling member is screw threaded to receive the hose connection. A passage 7 extends through the head establishing communication with the coupling member; while at the lower end of the passage a sleeve 8 is screw threaded into the head as shown in Fig. 1. The lower end of the head is externally screw threaded to receive a bearing collar 9, which is held in fixed relation with the head by a lateral pin 10 passed through the collar and engaged in the head as shown in Fig. 1. One or more recesses to receive the pin may be provided in the head thereby permitting the collar to be adjusted and locked. The parts described up to the point constitute the stationary or non-rotative elements, or in other words—the stationary supporting section of the swivel.

The movable or rotating section of the swivel comprises two main parts, a shell 11 and a coupling member 12, both cylindrical in form. The shell is fitted snugly about the sleeve 8 at its lower portion; while its upper portion is sufficiently enlarged to inclose the bearing collar 9. The shell is externally screw threaded at its upper end to receive a flat bearing disk 13, between the underside of which and the bearing collar 9 cone bearings 14 are interposed, suitable races being formed in the disk and collar. At its center the collar is formed with an upstanding annular shoulder 15, which takes the inward thrust of the bearings.

The disk 13 is locked against turning independently of the shell by a set screw 16 passed through the shell into one of a plurality of recesses 17 in the threaded surface of the disk. After the shell and disk have been adjusted, the screw is driven in and the parts locked. It is obvious that the shell and disk both being free to rotate it would be difficult to unscrew the shell from the disk, unless some means for holding the disk in fixed relation was provided. To effect this a boss 18, as shown in Fig. 2, is formed one side of the head so as to project over the disk. This boss is provided with a hole 19 adapted to register with a recess 20 in the disk, so that a pin or the like inserted in these openings will lock the disk and head together and permit the shell to be unscrewed. At the intersection of the boss and the head an oil passage 21 leads down the outer side of the head so as to discharge into the cavity about the bearings, at a point just above the shoulder 15. This passage being formed in the head and being disposed vertically, an oil bath may be maintained about the bearings 14 and a lubricant supplied through the port 21 at any time and while the swivel is in operation, if necessary.

As before stated the shell at its lower portion is fitted snugly about the sleeve 8; however, a suitable packing 22 is inserted from the lower end of the shell between the shell and sleeve. The lower portion of the shell is somewhat contracted and provided with an interior annular shoulder on which horizontal curved bosses 23 are formed in opposed relation. These bosses are at the bottom of the enlarged portion of the shell and form a support for the bearing collar 9. As shown in Fig. 4 outwardly flaring recesses 24 are formed between the bosses terminating in elongated slots 25 in the shell on each side, the shoulder of the shell forming the bottom of the recesses. This provision is made for the adjustment of a packing gland 26 embracing the sleeve and adapted to compress the packing 22 when drawn upward. In carrying out this portion of the invention, the object is to provide for the adjustment of the packing gland 26 from the outside of the shell and without unscrewing or removing any of the parts. With their heads disposed in the recesses 24, bolts 27 are passed down through the shell, one diametrically opposite the other. The heads of the bolts are shouldered, said shouldered portion of each fitting into a packing box 28 in the base of the recess 24. The lower threaded ends of the bolts extend below the shell and are screwed into a follower ring 29 encircling the sleeve 8, the inner periphery of the ring rounded transversely to permit the ring to rock and tilt out of a horizontal plane and compensate for an uneven adjustment of the bolts 27. On opposite sides and at right angles to the bolts, rounded lugs 30 extending up from the ring, as shown in Fig. 3, are seated in the lower edge of the gland 26, constituting a fulcrum on which the ring is tilted. It is obvious that by tightening up the bolts 27, the ring 29, will be drawn toward the shell, thereby forcing the packing into the stuffing box thus formed. By reason of the slots 25 and recesses 24, a suitable flat rigid jaw wrench may be inserted through the slots alternately and engaged with the bolt heads and the adjusting of the packing gland carried out from the exterior of the shell and without disturbing any of the other parts of the swivel. Sufficient space about the heads of the bolts is provided to permit a free movement and application of the wrench.

It is to be observed that while the features just described are exposed, the packing, gland and ring are inclosed and protected from foreign matter especially in view of the construction which will be described.

The lower end of the shell is shouldered and screw threaded to receive the annular coupling member 12 reduced at its lower end and externally screw threaded at that point to receive the drill pipe. The member 12 is shaped to provide an annular chamber 32 about the ring 29 and packing gland 26 in which a bath of oil is maintained by introducing the same through a port 33 in the side of the member, which port is normally closed by a screw plug 34. About the sleeve 8 in the lower end of the coupling member 12 a packing 35 is disposed and compressed by a flanged follower 36 screw threaded into the member about the sleeve.

It is apparent that a very compact and substantial swivel is provided, there being no thin walls or delicate parts. Further the bearings are well protected and efficiently lubricated and at the same time the construction is such as to remove any chance of the fluid leaking into the parts, the oil escaping, or foreign matter lodging between working parts.

What we claim is:

1. The combination in a hydraulic swivel, of a head adapted for connection with a support, a shell mounted to rotate about the head, bearings interposed between the head and the shell, a sleeve associated with the head and the shell, a packing about the sleeve, means for compressing the packing, and means operating through the shell for adjusting the compressing means.

2. The combination in a hydraulic swivel, of a head adapted for connection with a support, a shell mounted to rotate about the head, bearings interposed between the head and the shell, a sleeve associated with the head and the shell, a packing about the sleeve, means for compressing the packing, means operating through the shell for adjusting the compressing means and a coupling member fitting about the sleeve and on the shell, and providing an oil containing chamber about the packing compressing means.

3. In a hydraulic swivel, a non-rotative member, a rotative member coöperating with the first member, a sleeve associated with both members, a packing about the sleeve, and means inclosed within one of the members for adjusting the packing, said member having provision whereby the inclosed adjusting means may be adjusted from the exterior of the swivel without disconnecting any of the parts thereof.

4. In a hydraulic swivel, two members, one positioned about the other, a sleeve associated with the members, the outer member having an opening extending inward from its outer surface, a packing about the sleeve, and means for adjusting said packing having its operating end projecting into said opening.

5. In a hydraulic swivel, two members, one adapted to rotate about the other, a sleeve associated with the members, one of said members having wrench receiving openings, a packing about the sleeve, means for compressing the packing, and means for adjusting the compressing means having wrench engageable parts extending into the openings of said member.

6. In a hydraulic swivel, two members, one adapted to rotate about the other, a sleeve associated with the members, one of said members having wrench receiving openings exposed at the outer surface of the member, a packing about the sleeve, a gland engaging the packing, a follower associated with the gland, and adjusting bolts having their heads in the wrench receiving openings of the member and engaging the follower.

7. In a packing for hydraulic swivels, the combination with two members, one adapted to rotate about the other, and a sleeve associated with the members, of a packing about the sleeve, a gland engaging the packing, a follower adapted to have rocking engagement with the gland, and bolts extending through one of the members for adjusting the follower and the gland.

8. In a hydraulic swivel, two members, one adapted to rotate about the other, a sleeve associated with the members, one of said members having wrench receiving openings, a packing about the sleeve, means for compressing the packing, and means for adjusting the compressing means having wrench engaging parts extending into openings of the member.

9. In a hydraulic swivel, a head, a sleeve engaged in the head, a bearing collar mounted on the head and having an annular shoulder, cone bearings mounted on the collar with their small ends disposed against said shoulder; a bearing disk disposed over said bearings, a rotatable shell engaging the disk and inclosing the bearings and collar, of packing disposed between the sleeve and the shell, means for adjusting the packing extending through the shell, a coupling member embracing the sleeve and engaged with the shell, said coupling member having an oil containing chamber about the packing means, and a packing device associated with the lower ends of the sleeve and the coupling member.

10. A shell for a hydraulic swivel formed with an enlarged recessed upper portion, a reduced lower portion, and opposed bosses at the bottom of the recessed portion, there being spaces between the bosses, and the walls of the upper portion having openings registering with the spaces between the bosses.

In testimony whereof we have signed our names in the presence of two witnesses.

MAHLON E. LAYNE.
SAMUEL N. HALL.

Witnesses:
T. J. LAYNE,
JACK A. SCHLEY.